US010974186B2

(12) United States Patent
Horimoto et al.

(10) Patent No.: US 10,974,186 B2
(45) Date of Patent: Apr. 13, 2021

(54) CERAMIC POROUS BODY AND DUST COLLECTING FILTER

(71) Applicant: NGK INSULATORS, LTD., Nagoya (JP)

(72) Inventors: Rui Horimoto, Nagoya (JP); Mitsuhiro Ito, Nagoya (JP); Akifumi Kawakami, Nagoya (JP); Yuki Jin, Nagoya (JP); Hiroaki Noguchi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 54 days.

(21) Appl. No.: 16/292,740

(22) Filed: Mar. 5, 2019

(65) Prior Publication Data

US 2019/0299144 A1    Oct. 3, 2019

(30) Foreign Application Priority Data

Mar. 30, 2018    (JP) .............................. JP2018-069316

(51) Int. Cl.
*B01D 46/24*    (2006.01)
*B01D 53/94*    (2006.01)

(52) U.S. Cl.
CPC .......... *B01D 46/2429* (2013.01); *B01D 53/94* (2013.01); *B01D 2046/2437* (2013.01); *B01D 2279/30* (2013.01)

(58) Field of Classification Search
CPC ............ B01D 53/94; B01D 2046/2437; B01D 46/2429; B01D 2279/30
USPC ..................... 422/177, 180; 55/523; 428/116
See application file for complete search history.

(56) References Cited

U.S. PATENT DOCUMENTS

| 2003/0024220 A1 | 2/2003 | Ishihara et al. |
| 2003/0134084 A1 | 7/2003 | Ichikawa et al. |
| 2004/0033893 A1 | 2/2004 | Tomita et al. |
| 2017/0282108 A1* | 10/2017 | Mizuno .............. B01D 46/2429 |

FOREIGN PATENT DOCUMENTS

| DE | 102 35 806 A1 | 2/2003 |
| EP | 1 778 383 B1 | 3/2018 |
| JP | 2002-201082 A1 | 7/2002 |
| JP | 2002-356383 A1 | 12/2002 |
| WO | WO-2009122534 A1 * | 10/2009 ......... B01D 46/2474 |

OTHER PUBLICATIONS

German Office Action, German Application No. 10 2019 204 516.2, dated Nov. 4, 2020 (9 pages).

* cited by examiner

*Primary Examiner* — Tom P Duong
(74) *Attorney, Agent, or Firm* — Burr & Brown, PLLC

(57) ABSTRACT

A ceramic porous body comprising: skeleton portions; and pore portions formed between the skeleton portions, the pore portions being capable of allowing a fluid to flow therethrough. In the ceramic porous body, the pore portions satisfy the following equations (1) and (2) in a cross section parallel to a flow direction of the fluid;

$$L1/L2 \geq 0.92 \quad (1), \text{ and}$$

$$L1+L2 \leq 27 \, \mu m \quad (2)$$

in which L1 is an average length of the pore portions in the flow direction of the fluid; and L2 is an average length of the pore portions in a direction orthogonal to the flow direction of the fluid.

8 Claims, 5 Drawing Sheets

[FIG. 1]
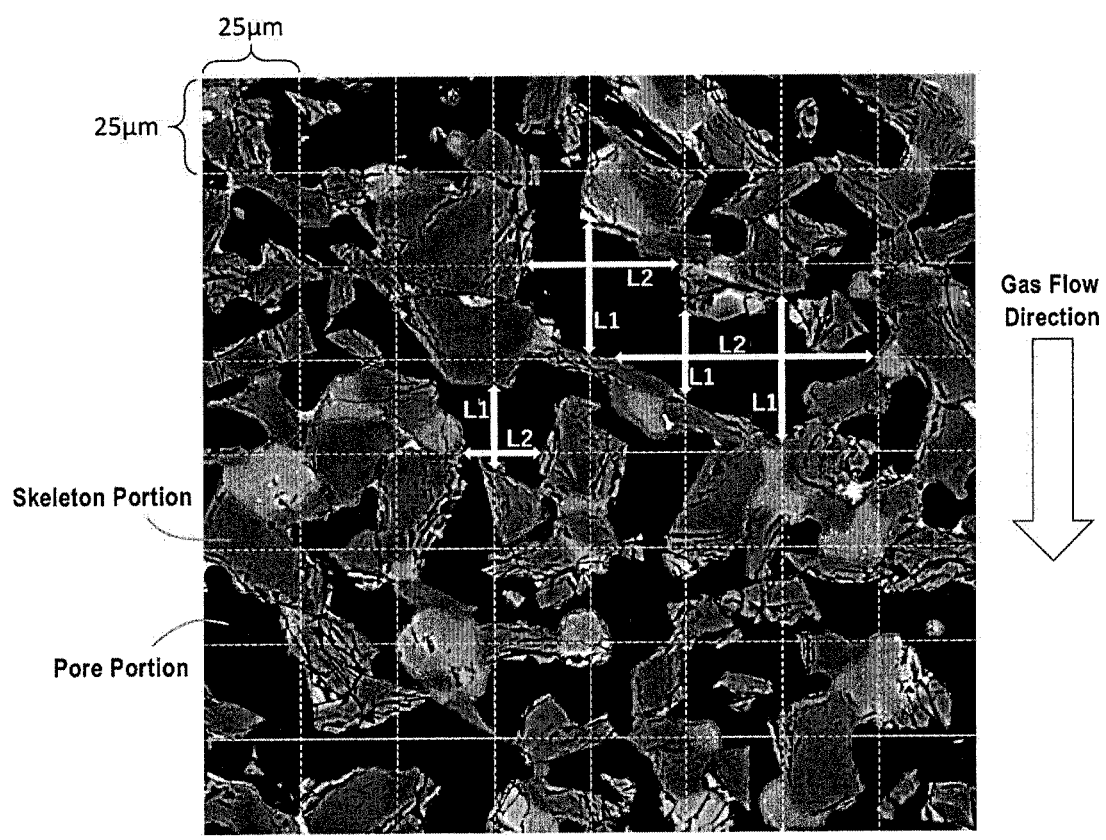

[FIG. 2]
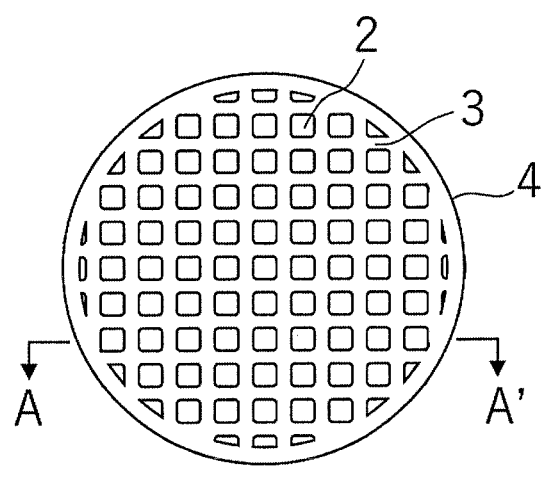
10

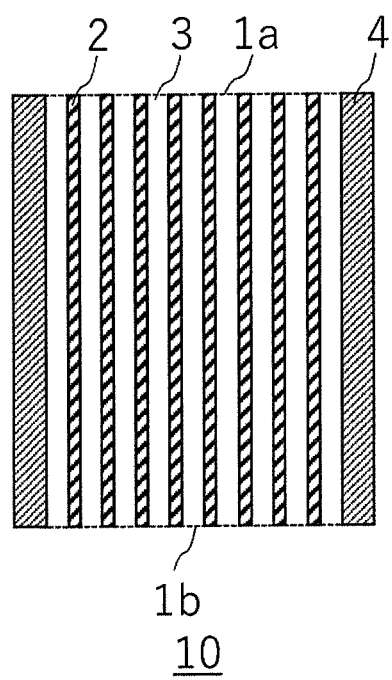
[FIG. 3]

[FIG. 4]
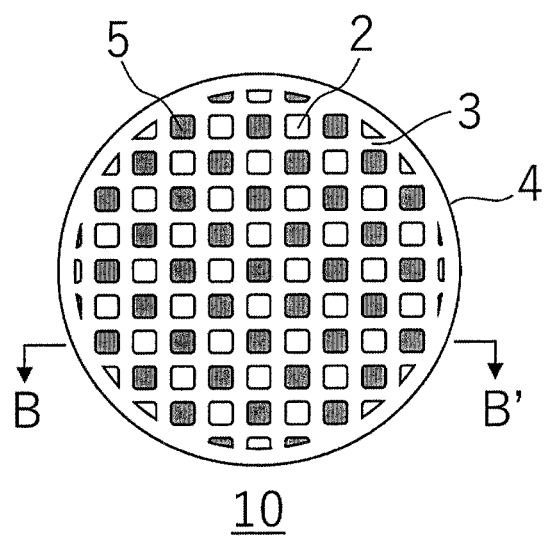

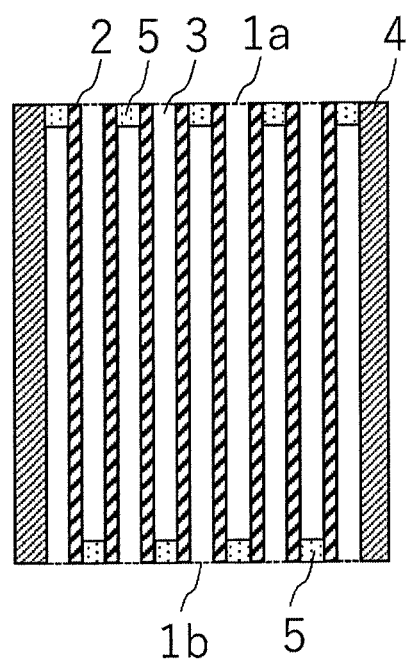
[FIG. 5]

CERAMIC POROUS BODY AND DUST COLLECTING FILTER

This application claims the benefit under 35 USC § 119(a)-(d) of Japanese Application No. 2018-069316 filed Mar. 30, 2018, the entirety of which is incorporated herein by reference.

FIELD OF THE INVENTION

The present invention relates to a ceramic porous body and a dust collecting filter.

BACKGROUND OF THE INVENTION

A large amount of particulate substances such as soot (hereinafter also referred to as "particulate matters" or "PMs") is contained in exhaust gases discharged from internal combustion engines such as diesel engines and gasoline engines, and various combustion devices. When the PMs are directly discharged into the atmosphere, environmental pollution is caused. Therefore, an exhaust system for an exhaust gas is equipped with a dust collecting filter (hereinafter also referred to as "particulate filter") for collecting the PMs. For example, the dust collecting filter used for purifying exhaust gases discharged from diesel engines or gasoline engines includes a diesel particulate filter (DPF), a gasoline particulate filter (GPF), and the like. In such DPF and GPF, a ceramic porous body is used that has a honeycomb structure in which a plurality of cells penetrating from a first end face to a second end face to form flow paths for an exhaust gas are defined by partition walls.

Further, the exhaust gas as stated above also contains harmful substances such as NOx, CO and HC. Catalytic reaction is widely used when reducing an amount of harmful substances in the exhaust gas to purify the exhaust gas. In the purification of the exhaust gas utilizing such a catalytic reaction, a ceramic porous body having the above honeycomb structure is also used as a catalyst support for supporting a catalyst.

By the way, as the ceramic porous body used for the dust collecting filter is used, particulate matters such as soot are accumulated on a surface or an inner side of the ceramic porous body. This results in an increased pressure loss of the ceramic porous body and hence deteriorated function as a dust collection filter. Therefore, to regenerate the function as a dust collecting filter, a treatment is carried out for burning and removing the particulate matters deposited on the surface or inner side of the porous ceramic body at regular intervals.

However, the conventional ceramic porous body has problems that, since it has low thermal conductivity, local heat generation occurs when the particulate matters deposited on the surface or inner side of the porous ceramic body is burned, and the particulate matters cannot be sufficiently removed.

Therefore, to increase the thermal conductivity of the ceramic porous body, the Applicant has proposed a ceramic porous body including: a skeleton portions including an aggregate such as silicon carbide particles and a binding material such as metallic silicon; and pore portions formed between the skeleton portions, the pore portions being capable of allowing a fluid to flow therethrough, in Patent Document 1.

However, the ceramic porous body disclosed in Patent Document 1 may not have good wettability between the binding material and the aggregate, and may lead to decreased strength and thermal conductivity as a result of a decreased contact area between the binding material and the aggregate.

Therefore, in Patent Document 2, the Applicant has proposed a ceramic porous body having increased strength and thermal conductivity by improving the wettability between the binding material and the aggregate.

CITATION LIST

Patent Literatures

Patent Document 1: Japanese Patent Application Publication No. 2002-201082 A

Patent Document 2: Japanese Patent Application Publication No. 2002-356383 A

SUMMARY OF THE INVENTION

Technical Problem

The ceramic porous body disclosed in Patent Document 2 has a structure in which secondary tissue particles (domains) with a large number of aggregates in contact with one binding material are bonded to one another, and thus has pores each having increased diameter due to voids between the domains. However, the ceramic porous body may have insufficient pore connectivity, and lead to an increase in pressure loss upon use as a filter. Therefore, when the ceramic porous body having such a structure is used as a dust collecting filter, the pressure loss is rapidly increased during use, and, in some cases, the regeneration treatment has to be frequently performed. In general, the ceramic porous body used for the dust collecting filter is often used in a state where particulate matters are deposited. Therefore, there is a need for suppressing an increase in pressure loss in a state where the particulate matters are deposited.

On the other hand, it is considered that to suppress an increase in pressure loss, a porosity of the ceramic porous body is increased. However, in this approach, the strength and thermal conductivity of the ceramic porous body tend to be decreased. It is also considered that an average pore diameter of the ceramic porous body is increased. However, a number of particulate matters leaked tends to be increased. Thus, simply controlling the porosity and the average pore diameter of the ceramic porous body can suppress the increase in the pressure loss, but it causes various problems.

The present invention has been made to solve the above problems. An object of the present invention is to provide a ceramic porous body that has a decrease number of particulate matters leaked and also can suppress an increase in pressure loss upon use, and a dust collecting filter.

Solution to Problem

The present inventors have found that, in a ceramic porous body including: skeleton portions; and pore portions formed between the skeleton portions and capable of allowing a fluid to flow therethrough, the shape of each pore portion is closely related to the number of particulate matters leaked and the pressure loss. Based on the findings, the present inventors have found the above problems can be solved by controlling the shape of the pore portions, and have completed the present invention.

Thus, the present invention relates to:

a ceramic porous body comprising: skeleton portions; and pore portions formed between the skeleton portions, the pore portions being capable of allowing a fluid to flow therethrough, wherein the pore portions satisfy the following equations (1) and (2) in a cross section parallel to a flow direction of the fluid;

$$L1/L2 \geq 0.92 \quad (1), \text{ and}$$

$$L1+L2 \leq 27 \text{ μm} \quad (2)$$

in which L1 is an average length of the pore portions in the flow direction of the fluid; and L2 is an average length of the pore portions in a direction orthogonal to the flow direction of the fluid.

Further, the present invention relates to a dust collecting filter comprising the ceramic porous body.

Advantageous Effects of Invention

According to the present invention, it is possible to provide a ceramic porous body that has a decreased number of particulate matters leaked and also can suppress an increase in pressure loss upon use; and a dust collecting filter.

BRIEF DESCRIPTION OF THE DRAWINGS

FIG. 1 is an analytical photograph of a ceramic porous body by SEM.

FIG. 2 is a plan view of a ceramic porous body according to Embodiment 2 as viewed from a first end face side.

FIG. 3 is a cross-sectional view showing a cross section taken along the line A-A' in FIG. 2.

FIG. 4 is a plan view of a ceramic porous body according to Embodiment 3 as viewed from a first end face side.

FIG. 5 is a cross-sectional view showing a cross section taken along the line B-B' in FIG. 4.

DETAILED DESCRIPTION OF THE INVENTION

Hereinafter, preferred embodiments of a ceramic porous body and a dust collecting filter according to the present invention will be specifically described, but the present invention should not be construed as being limited thereto, and various modifications and improvements may be made based on the knowledge of a person skilled in the art, without departing from the spirit of the present invention. A plurality of elements disclosed in each embodiment can form various inventions by proper combinations. For example, some elements may be deleted from all the elements described in the embodiments, or elements of different embodiments may be optionally combined.

Embodiment 1

The porous ceramic body of the present embodiment includes: skeleton portions; and pore portions formed between the skeleton portions and capable of allowing a fluid to flow therethrough.

Since each of the pore portions is a flow path for a fluid, its shape is closely related to the number of particulate matters leaked and pressure loss. Therefore, in terms of achieving both reduction of the number of particulate matters leaked and suppression of an increase in pressure loss, the ceramic porous body according to the present embodiment is controlled such that the shape of each of the pore portions satisfies the following equations (1) and (2) in a cross section in a direction parallel to a flow direction of the fluid.

$$L1/L2 \geq 0.92 \quad (1), \text{ and}$$

$$L1+L2 \leq 27 \text{ μm} \quad (2).$$

In the above equations (1) and (2), L1 is an average length of the pore portions in the flow direction of the fluid; and L2 is an average length of the pore portions in a direction orthogonal to the flow direction of the fluid.

The ratio L1/L2 of 0.92 or more improves connectivity of pores in the flow direction of the fluid, so that an increase in pressure loss can be suppressed. In terms of stably obtaining the effect, the ratio L1/L2 is preferably 1.00 or more, and more preferably 1.05 or more.

Further, the value of L1+L2 of 27 μm or less allows control of the size of each pore portion, so that the number of particulate matters leaked can be reduced. In terms of stably obtaining the effect, L1+L2 is preferably 25 μm or less, and more preferably 22 μm or less.

L1 and L2 can be calculated as follows. First, a test piece having a cut surface in a direction parallel to a flowing direction of a fluid is cut out from the ceramic porous body. Then, after embedding the cut surface of the test piece in a resin, the cut surface is polished and observed with a scanning electron microscope (SEM), and image analysis of the observed photograph is carried out. On the basis of the obtained analytical photograph, the image analysis calculates L1 and L2.

Here, an analytical photograph of the ceramic porous body by SEM is shown in FIG. This analysis photograph is a cross sectional photograph at magnifications of 500 (200 μm×200 μm). In this cross-sectional photograph, straight lines are drawn in a vertical direction (the flow direction of the fluid) and a lateral direction (the direction orthogonal to the flow direction of the fluid) at intervals of 25 μm, respectively, and all lengths of the pore portions located on the straight lines in these directions are determined, and an average value of them can be calculated to obtain L1 and L2.

The value of L2 is not particularly limited as long as it is in a range satisfying the above equations (1) and (2), but it may preferably be 5 or more, and more preferably 9 or more, in terms of suppressing an increase in pressure loss. Further, the value of L2 may preferably be 15 or less, and more preferably 13 or less, in terms of collection performance.

A material for forming the skeleton portions is not particularly limited, but it may preferably include an aggregate and at least one binding material.

The aggregate used for the skeleton portions is not particularly limited, but known aggregates in the technical field may be used. Among them, the aggregate is preferably silicon carbide, silicon nitride, aluminum nitride, mullite, titanium oxide or a composite oxide containing the same (for example, aluminum titanate). By using such a material as an aggregate, a ceramic porous body having improved strength and improved thermal shock resistance can be obtained.

An average particle diameter of the aggregate is preferably 40 μm or less, and more preferably 30 μm or less. By using the aggregate having such an average particle diameter, coarse skeleton portions will be difficult to be formed, and the pore portions having good communicability will be easily formed between the skeleton portions. A lower limit of the average particle diameter of the aggregate is not particularly limited, but it may preferably be 10 µm, and more preferably 15 µm.

The "average particle diameter" as used herein refers to a particle diameter at an integrated value 50% in a particle size distribution obtained by the laser diffraction/scattering method.

The binding material used for the skeleton portions is not particularly limited, and known binding materials in the technical field can be used. Among them, the binding material is preferably at least one selected from the group consisting of metallic silicon, silicon carbide, aluminum oxide and a composite oxide containing the same (for example, cordierite). By using such a binding material with a suitably selected ratio to the aggregate, a porous ceramic body having improved thermal conductivity can be obtained.

Although silicon carbide is also used as the aggregate, it also acts as the binding material depending on the types of aggregates used together and the firing temperatures. For example, when an organic material containing Si and C is used as a raw material together with silicon carbide as an aggregate, silicon carbide produced by reactive sintering of the organic material at about 1800° C. acts as a binding material.

Each skeleton portion may further contain oxides derived from a sintering aid containing two or more components. Here, the type of the oxides derived from the sintering aid can be identified from the type of the sintering aid to be used and the firing temperature.

In the oxides, a proportion of a binary oxide having the lowest melting point is preferably from 25 to 50% by mass. When the proportion of the binary oxide having the lowest melting point is more than 50% by mass, coarse skeleton portions will tend to be formed, so that communicability of the pores may not be sufficiently ensured. On the other hand, when the proportion of the binary oxide having the lowest melting point is less than 25% by mass, the strength and thermal conductivity may not be sufficiently ensured.

Here, the melting point of the oxide derived from the sintering aid can be specified from an equilibrium state diagram of the oxides of the metal elements contained in the sintering aid. Further, the proportion of the binary oxide having the lowest melting point can be controlled by adjusting the type and proportion of the components contained in the sintering aid. Furthermore, the proportion of the binary oxide having the lowest melting point may be determined by carrying out compositional analysis with fluorescent X-ray analysis (XRF) of the raw material, obtaining a mass ratio of each oxide derived from the sintering aid from an introduced amount of the raw material, and then calculating a mass ratio of the binary oxide having the lowest melting point in those oxides.

The components contained in the sintering aid are not particularly limited, and those known in the technical field can be used. The sintering aid generally contains a compound containing an alkaline earth metal element(s). Examples of the compound containing an alkaline earth metal(s) include fluorides, carbides, chlorides, silicides, carbonates, hydroxides, oxides, inorganic acid salts and organic acid salts of calcium, magnesium or strontium. These can be used alone or in combination of two or more. The sintering aid may further contain a compound containing an element(s) other than the alkaline earth metal element, in terms of controlling the melting point of the sintering aid.

In one embodiment, the sintering aid is a mixture of a compound containing strontium, a compound containing aluminum, and a compound containing silicon. Here, each compound may contain two or more metal elements. For example, the compound containing silicon may contain aluminum. Among them, a preferable sintering aid is a mixture of strontium oxide, silicon dioxide and aluminum oxide, or a raw material which provides the mixture during the firing. Example of the raw material which provides strontium oxide during the firing include strontium carbonate. Examples of the raw material which provides silicon dioxide during the firing include silicon dioxide. Examples of the raw material which provides aluminum oxide during the firing include silicate compounds, for example, clay minerals such as bentonite, montmorillonite, kaolin and sepiolite. When using the sintering aid made of such a mixture or such a raw material which provides the mixture, a binary oxide of strontium and silicon (Si—Sr based oxide) and $Al_2O_3$ are produced during the firing, and the Si—Sr based oxide will be the binary oxide having the lowest melting point.

A porosity of the ceramic porous body is not particularly limited, but it may preferably be 30% or more, and more preferably 35% or more, and even more preferably 39% or more. The porosity in such a range allows for ensuring easy flow of a fluid (a filtration rate) when the ceramic porous body is used as a filter. The porosity of the ceramic porous body may preferably be 50% or less, and more preferably 45% or less. The porosity in such a range allows suppression of an increase in pressure loss when the ceramic porous body is used as a filter.

The "porosity" as used herein refers to a porosity measured by mercury porosimetry according to JIS R 1655: 2003.

The ceramic porous body having the above features can be produced by a method for producing a ceramic porous body, including the steps of forming a green body to provide a formed body, the green body including: an aggregate; at least one biding material; and at least one binder, wherein a mass ratio of the aggregate to the binding material is from 65:35 to 85:15; and firing the formed body at a temperature higher than or equal to a melting point of the binding material and lower than or equal to a melting point of the binding material+50° C. for 1 to 4 hours. Further, a sintering aid containing two or more components may be blended in the green body. In particular, by incorporating the sintering aid and firing the green body at a predetermined firing temperature for a predetermined firing time, a contact area between the aggregate and the binding material can be controlled within a predetermined range, so that values of L1/L2 and L1+L2 can be controlled within proper ranges, depending on a generation ratio of glass phases and crystal phases of an oxide (for example, a silicate compound) generated by reaction of the sintering aid during the firing. The values of L1/L2 and L1+L2 cannot be controlled within the above ranges if the mass ratio of the binding agent to the aggregate, the firing temperature and the firing time are not within the above ranges. In the oxides of the sintering aid formed during the firing, the binary oxide having the lowest melting point preferably has a melting point lower than or equal to the firing temperature, and the proportion of the binary oxide is preferably from 25 to 50% by mass, in order to obtain the above function of the sintering aid. The melting point and proportion of the binary oxide can be adjusted by controlling the type and mixing ratio of the components used for the sintering aid. For example, when using the sintering aid containing three components, the mixing ratio of a remaining component can be increased as compared with that of two components which provide the binary oxide having the lowest melting point, thereby increasing the proportion of the crystal phases of the oxide. Therefore, by carrying out the firing under the above conditions, the contact area ratio can be controlled within the predetermined range, and the communicability of the pores can be improved.

The melting point of the binary oxide is not particularly limited, but it may preferably be 1300° C. or higher. If the melting point is less than 1300° C., the glass phase of the oxide tends to be difficult to remain in the skeleton portions in a desired form even if the glass phase is generated during a temperature rising process during the firing. As a result, it may be difficult to control the values of L1/L2 and L1+L3 to be within the above ranges. On the other hand, if the melting point is higher than 1450° C., it will be difficult to form the glass phase of the oxide during the firing and it will be difficult for the glass phase in a desired form to be present in the skeleton portions. As a result, it may be difficult to control the values of L1/L2 and L1+L2 to be within the above ranges.

An amount of the sintering aid incorporated is not particularly limited, but it is generally 5% by mass or less, relative to the total amount of the aggregate and the binding material.

The binder is not particularly limited, and known binders in the technical field can be used. Examples of the binder include organic binders such as methyl cellulose and hydroxypropoxyl methyl cellulose. These can be used alone or in combination of two or more.

An amount of the binder incorporated is not particularly limited, but it is generally from 5 to 8% by mass, relative to the total amount of the aggregate and the binding material.

Further, to adjust the porosity of the ceramic porous body, a pore former may be added to the raw material for the green body. The pore former is not particularly limited, and any known pore former in the technical field can be used. Examples of the pore former include graphite, wheat flour, starch, phenol resins, polymethylmethacrylate, polyethylene, polyethylene terephthalate, and the like. These can be used alone or in combination of two or more.

An amount of the pore former added may be adjusted as needed according to its type and degree of porosity, and is not particularly limited.

The green body can be obtained by mixing and kneading the above raw materials. A method for mixing and kneading the raw materials is not particularly limited, and it can be carried out by a method known in the art. For example, the mixing and kneading of the raw materials can be carried out using a kneader, a vacuum green body kneader or the like.

Similarly, a method for forming the green body is not particularly limited, and it can be carried out by a method known in the art.

The formed body may be calcined before the firing in order to remove (degrease) the binder contained in the formed body. The calcination is preferably performed at a temperature lower than a temperature at which metallic silicon is melted. More particularly, it may be once held at a predetermined temperature of from about 150 to 700° C., or it may be calcined by slowing down a rate of temperature rising to 50° C./hr or less in the predetermined temperature range.

The method of being once held at the predetermined temperature may be holding only at one temperature level or holding at a plurality of temperature levels, depending on the type and amount of the binder used. Further, in case of holding at plurality of temperature levels, the holding times may be the same as or different from each other. Similarly, the method of slowing down the rate of the temperature rising may be slowing only in a certain temperature zone or in a plurality of zones. Further, in the case of the plurality of zones, the rates may be the same as or different from each other.

An atmosphere of the calcination may be an oxidizing atmosphere. However, when the formed body contains a large amount of binder, the binder vigorously burns out with oxygen during the calcination and the temperature of the formed body may be sharply increased. Therefore, the calcination may be carried out in an inert atmosphere such as $N_2$ and Ar to suppress abnormal temperature rise of the formed body. The suppression of the abnormal temperature rise is an important control when a raw material having a higher thermal expansion coefficient (i.e., which is weak against thermal shock) is used. When the binder is blended in an amount of 20% by mass or more based on the total amount of the main raw materials (the aggregate and the binding material), the calcination is preferably carried out in an inert atmosphere. In addition to the case where the aggregate is silicon carbide particles, even in the case where oxidation at elevated temperature is concerned, the calcination is preferably carried out in the inert atmosphere, at least at a temperature higher than or equal to an oxidation initiating temperature, to suppress oxidation of the formed body.

The calcination and subsequent firing may be carried out in different steps in the same furnace or different furnaces or may be a continuous step in the same furnace. Although the former method is also a preferred approach when the calcination and the firing are performed in different atmospheres, the latter method is also preferable from the standpoint of the total firing time, operating cost of the furnace and the like.

The atmosphere of the firing may be determined according to the type of aggregate. For example, when using an aggregate which is concerned about oxidation at an elevated temperature, a non-oxidizing atmosphere such as $N_2$ and Ar is preferred, at least in a temperature range higher than or equal to an oxidation initiating temperature.

The ceramic porous body according to the present embodiment produced as described above has the appropriately controlled shape of each pore portion (the values of L1/L2 and L1+L2), so that it has higher collecting efficiency of particulate matters, and also can suppress the pressure loss upon use.

Embodiment 2

A porous ceramic body according to the present embodiment has a honeycomb structure in which a plurality of cells penetrating from a first end face to a second end face to form fluid flow paths are defined by partition walls. In the ceramic porous body having such a honeycomb structure, the partition walls correspond to the ceramic porous body. Further, in the ceramic porous body having the honeycomb structure, "a direction parallel to a flow direction of a fluid" refers to a direction orthogonal to a cell extending direction, and "a flow direction of a fluid" refers to a thickness direction of the partition wall.

The ceramic porous body according to the present embodiment is the same as the ceramic porous body of Embodiment 1, with the exception that the former has a predetermined honeycomb structure. Therefore, the descriptions of the configuration common to Embodiment 1 will be omitted here, and only portions different from those of Embodiment 1 will be described.

FIG. 2 is a plan view of the ceramic porous body according to the present embodiment as view from the first end face side. FIG. 3 is a cross-sectional view showing a cross section taken along the line A-A' in FIG. 2.

As shown in FIGS. 2 and 3, a ceramic porous body 10 includes partition walls 3 that defines a plurality of cells 2 penetrating from a first end face 1a to a second end face 1b to form fluid flow paths. Further, an outer peripheral wall 4 is formed on an outer peripheral surface of the ceramic porous body 10.

A thickness of each partition wall 3 is not particularly limited, but it may preferably be from 100 to 500 µm, and more preferably from 150 to 400 µm, and even more preferably from 150 to 300 µm. The partition wall having such a thickness allows suppression of an increase in pressure loss while ensuring the strength of the partition walls 3.

A cell density in the ceramic porous body 10 is not particularly limited, but it may preferably be from 15 to 100 cells/cm², and more preferably from 30 to 65 cells/cm², and still more preferably from 30 to 50 cells/cm². Such a cell density allows improvement of a trapping efficiency of particulate matters while suppressing an increase in pressure loss when the ceramic porous body is used as a dust collecting filter.

The shape of the cell 2 is not particularly limited, and it may be a shape known in the art. As used herein, "the shape of the cell 2" refers to the shape of each cell 2 in a cross section in a direction orthogonal to an extending direction of the cell 2. Examples of the shape of the cell 2 include a square, a hexagon, an octagon, and the like.

The shape of the ceramic porous body 10 is not particularly limited, and it may be a pillar shape in which end faces (the first end face 1a and the second end face 1b) are circular (a cylindrical shape); a pillar shape in which end faces are oval; and a pillar shape in which end faces are polygonal (for example, pentagonal, hexagonal, heptagonal, octagonal, etc.); and the like.

The length from the first end face 1a to the second end face 1b of the ceramic porous body 10 and the size of the cross section orthogonal to the extending direction of the cell 2 may be optionally set according to working conditions and use application of the ceramic porous body, and is not particularly limited.

In the ceramic porous body according to the present embodiment, a catalyst for purifying an exhaust gas may be supported on at least one of the surface of each partition wall 3 and the pores of each partition wall 3. The catalyst that can be used is known in the art. Examples of the catalyst include noble metals such as platinum, palladium, rhodium, iridium and silver; and oxides such as alumina, zirconia, titania, ceria and iron oxide. These can be used alone or in combination of two or more.

The ceramic porous body 10 having the above features can be produced in the same method as that of Embodiment 1, with the exception that a formed body is produced by extrusion molding. The extrusion molding can be carried out using a die having a desired cell shape, partition wall thickness and cell density. The formed body having a honeycomb structure thus obtained may be dried before firing. A non-limiting drying method may be hot air drying, microwave drying, dielectric drying, reduced pressure drying, vacuum drying, freeze drying and the like. Among them, the dielectric drying, the microwave drying and the hot air drying may be carried out alone or in combination with one another. The drying may be carried out under conditions at a drying temperature of from 30 to 150° C. for a drying time of from 1 minute to 2 hours, but not particularly limited to thereto. As used herein, the "drying temperature" refers to a temperature of an atmosphere in which the drying is carried out.

Embodiment 3

A ceramic porous body according to the present embodiment is different from the ceramic porous body according to Embodiment 2 in that the honeycomb structure of the former further includes opening portions of predetermined cells on the first end face and plugged portions provided at the opening portions of the remaining cells on the second end face. Therefore, descriptions of the configuration common to Embodiment 2 will be omitted herein, and only portions different from those of Embodiment 2 will be described.

FIG. 4 is a plan view of the ceramic porous body of the present embodiment as view from the first end face side. FIG. 5 is a cross-sectional view showing a cross section taken along the line B-B' in FIG. 4.

As shown in FIGS. 4 and 5, the ceramic porous body 10 according to the present embodiment includes opening portions of predetermined cells 2 on a first end face 1a and plugged portions 5 provided at the opening portions of the remaining cells 2 on a second end face 1b. The ceramic porous body thus configured can be used as a particulate filter for purifying exhaust gases discharged from internal combustion engines or various combustion devices.

When producing the ceramic porous body 10 provided with the plugged portions 5, the opening portions of the cells 2 of a formed body having a honeycomb structure or a dried body obtained by drying the formed body are plugged with a plugging material. The method for plugging the opening portions of the cells 2 may employ a method for filling the opening portions of the cells with the plugging material. The method for filling with the plugging material can be carried out in accordance with a conventionally known method for a honeycomb structure provided with plugged portions 5. For a plugged portion-forming raw material for forming the plugged portion 5, a plugged portion-forming raw material may be used, which is used for a conventionally known method for producing a honeycomb structure.

EXAMPLES

Hereinafter, while the present invention will be more specifically described with reference to Examples, the present invention is not limited to these Examples.

Example 1

To 100 parts by mass of a ceramic raw material having a mass ratio of silicon carbide (aggregate) with an average particle diameter of 25 µm and metallic silicon (binding material) of 75:25 were added 1.62 parts by mass of a mixture (sintering aid) of strontium oxide, silicon dioxide and aluminum oxide, 7.0 parts by mass of methyl cellulose (binder) and water, kneaded in a kneader, and then kneaded in a vacuum green body kneader to obtain a green body. It should be noted that the mass ratio of strontium oxide, silicon dioxide and aluminum oxide was 0.49:0.19:0.95. The green body thus obtained was formed into a quadrangular pillar shaped honeycomb structure having a length of one side of the end face of 38 mm, a thickness of the partition wall of 300 μm, and a cell density of 45 cells/cm$^2$, by means of an extruder. The resulting formed body was then subjected to microwave drying and then dried with hot air at 80° C. to obtain a dried body. The resulting dried body was then degreased in air at 450° C. for 5 hours. The degreased dried body was then fired in an Ar atmosphere at 1430° C. for 2 hours to obtain a ceramic porous body.

Example 2

A ceramic porous body was obtained in the same method as that of Example 1, with the exception that an average particle diameter of the aggregate was changed to 33 μm.

Example 3

A ceramic porous body was obtained in the same method as that of Example 1, with the exception that an average particle diameter of the aggregate was changed to 18 μm and the sintering aid was not used.

Comparative Example 1

To 100 parts by mass of a ceramic raw material having a mass ratio of silicon carbide (aggregate) to metallic silicon (binding material) of 80:20 were added 2.07 parts by mass of a mixture (sintering aid) of strontium oxide, silicon dioxide and alumina, 7.0 parts by mass of methyl cellulose (binder), 3.0 parts by mass of starch (pore former) and water, kneaded in a kneader, and then kneaded in a vacuum green body kneader to obtain a green body. Using the green body, a ceramic porous body was obtained in the same method as that of Example 1. It should be noted that the mass ratio of strontium oxide, silicon dioxide and aluminum oxide was 0.98:0.62:0.47.

Comparative Example 2

A ceramic porous body was obtained in the same method as that of Comparative Example 1, with the exception that the amount of the pore former added was changed to 15.0 parts by mass.

The ceramic porous bodies obtained in Examples and Comparative Examples as described above were subjected to the following evaluations.
(Proportion of Binary Oxide Having the Lowest Melting Point)

Based on the sintering aid and the sintering temperature used in each of Examples and Comparative Examples as described, a binary oxide of strontium and silicon (Si—Sr based oxide: a melting point of 1350° C.) and Al$_2$O$_3$ (a melting point of 2072° C.) are produced as oxides derived from the sintering aid. Therefore, fluorescent X-ray analysis (XRF) of the raw material was carried out to determine a mass ratio of the Si—Sr based oxide and Al$_2$O$_3$ contained in the oxides produced after the firing from the amount of the raw material incorporated. The proportion of the Si—Sr based oxide in these oxides was then calculated.
(Porosity)

The porosity was measured using a mercury porosimeter (Autopore IV9500 available from Micromeritics).
(L1/L2 and L1+L2)

Each ceramic porous body was cut in a direction orthogonal to the extending direction of the cell to obtain a test piece. Then, after embedding the cut surface of the test piece in a resin, the cut surface was polished to obtain an inner cross section. This was then observed with a scanning electron microscope (SEM), and image analysis of the observed photograph was carried out. The analysis photograph was a cross sectional photograph at magnifications of 500 (200 μm×200 μm). In this cross-sectional photograph, straight lines were drawn in a vertical direction (the flow direction of the fluid) and a lateral direction (the direction orthogonal to the flow direction of the fluid) at intervals of 25 μm, respectively, and all lengths of the pore portions located on the straight lines in these directions were determined, and an average value of them was calculated to obtain L1 and L2, and L1/L2 and L1+L2 were calculated.
(Difference of Increase in Pressure Loss with Soot)

The difference of increase in pressure loss with soot means a value of a difference (P2−P1) between a pressure loss (P1) when the soot is not deposited and a pressure loss (P2) after depositing the soot.

The difference of increase in pressure loss with soot was measured as follows. First, air at 0.15 mm$^3$/min was allowed to flow through each ceramic porous body in a state where the soot was not trapped, and each ceramic porous body was measured for the after/before pressure difference (pressure loss P1). Soot generated by a soot generator ("CAST 2" available from TOKYO DYLEC CORP.) was deposited in each ceramic porous body in an amount of 0.1 g/L. Air at 0.15 mm$^3$/min was then passed through each ceramic porous body in which the soot was deposited, and a pressure difference (pressure loss P2) at that time was measured. Subsequently, the difference of increase in pressure loss with soot was calculated from the equation: P2−P1. When allowing air to flow, plugging was previously applied to each ceramic porous body such that air flowed in a direction parallel to the thickness direction of the partition wall. Further, the evaluation results of the pressure loss with soot were based on the result of Comparative Example 1, and expressed as an increase/decrease ratio to the value of the pressure loss value with soot of Comparative Example 1.
(PN Leaked Number)

An exhaust gas at 200° C., which contained PM, was generated by a burner using light oil as a fuel. The exhaust gas was supplied to the ceramic porous body at a flow rate of 15 Nm$^2$/min for 2 hours to trap PM in each porous ceramic body, and PN (a number of particles exhausted) in the exhaust gas coming out from the backside of the ceramic porous body (downstream side in the flow direction of the gas) was measured by a PN counter. Evaluation of the PN leaked number was based on the result of Comparative Example 1, and a ceramic porous body having a PN leaked number less than that of Comparative Example 1 was expressed as "0", and a ceramic porous body having a PN leaked number equivalent to that of Comparative Example 1 was expressed as "Δ", and a ceramic porous body having a PN leaked number larger than that of Comparative Example 1 was expressed as "x".

The above evaluation results are shown in Table 1.

TABLE 1

| | Binary Oxide [Si—Sr Based Oxide] (parts by mass) | Remaining Oxide [$Al_2O_3$] (parts by mass) | Percentage of Binary Oxide (%) | Porosity (%) | L1 (μm) | L2 (μm) | L1/L2 | L1 + L2 (μm) | Difference of Increase in Pressure Loss with Soot (%) | PN Leaked Number |
|---|---|---|---|---|---|---|---|---|---|---|
| Example 1 | 0.68 | 0.95 | 42 | 43.1 | 12.26 | 9.25 | 1.324 | 21.509 | −20 | ○ |
| Example 2 | 0.68 | 0.95 | 42 | 40.4 | 12.66 | 13.15 | 0.963 | 25.818 | −15 | Δ |
| Example 3 | 0 | 0 | 0 | 47.8 | 12.35 | 13.42 | 0.921 | 25.765 | −25 | ○ |
| Comparative Example 1 | 1.60 | 0.47 | 77 | 41.4 | 12.31 | 14.07 | 0.875 | 26.384 | — | — |
| Comparative Example 2 | 1.60 | 0.47 | 77 | 47.1 | 15.29 | 16.11 | 0.949 | 31.404 | −30 | x |

As shown in Table 1, each of the ceramic porous bodies according to Examples 1 and 2 in which the equations: L1/L2≥0.92 and L1+L2≤27 μm were satisfied provided better results of both of the difference in pressure loss with soot and the PN leaked number.

However, each of the ceramic porous bodies according to Comparative Examples 1 and 2 in which L1/L2 and L1+L2 μm did not satisfy the above ranges provided a poor result of the difference in pressure loss with soot or the PN leaked number.

As can be seen from the above results, the present invention can provide a ceramic porous body that has a higher collecting efficiency of particulate matters and also can suppress an increase in pressure loss upon use; and a dust collecting filter.

DESCRIPTION OF REFERENCE NUMERALS 1a first end face
1b second end face
2 cell
3 partition wall
4 outer peripheral wall
5 plugged portion
10 ceramic porous body

The invention claimed is:

1. A ceramic porous body comprising: skeleton portions; and pore portions formed between the skeleton portions, the pore portions being capable of allowing a fluid to flow therethrough,
wherein the pore portions satisfy the following equations (1) and (2) in a cross section parallel to a flow direction of the fluid;

$$L1/L2 \geq 0.92 \quad (1), \text{ and}$$

$$L1+L2 \leq 27 \text{ μm} \quad (2)$$

in which L1 is an average length of the pore portions in the flow direction of the fluid; and L2 is an average length of the pore portions in a direction orthogonal to the flow direction of the fluid.

2. The ceramic porous body according to claim 1, wherein L2 is from 5 to 13 μm.

3. The ceramic porous body according to claim 1, wherein the skeleton portions comprise an aggregate and at least one binding material.

4. The ceramic porous body according to claim 3, wherein the aggregate is silicon carbide, titanium oxide or a mixture thereof.

5. The ceramic porous body according to claim 3, wherein the binding material is at least one selected from the group consisting of metallic silicon, silicon carbide, aluminum oxide and cordierite.

6. The ceramic porous body according to claim 1, wherein the porous ceramic body has a honeycomb structure in which a plurality of cells are defined by partition walls, the cells penetrating from a first end face to a second end face to form fluid flow paths.

7. The ceramic porous body according to claim 6, wherein the honeycomb structure comprises opening portions of some of the cells on a first end face and plugged portions provided at the opening portions of the remaining cells on a second end face.

8. A dust collecting filter comprising the ceramic porous body according to claim 1.

* * * * *